(12) United States Patent
Hong

(10) Patent No.: US 12,402,163 B2
(45) Date of Patent: Aug. 26, 2025

(54) METHOD FOR RANDOM ACCESS, COMMUNICATION DEVICE, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 18/014,126

(22) PCT Filed: Aug. 6, 2020

(86) PCT No.: PCT/CN2020/107523
§ 371 (c)(1),
(2) Date: Dec. 30, 2022

(87) PCT Pub. No.: WO2022/027484
PCT Pub. Date: Feb. 10, 2022

(65) Prior Publication Data
US 2023/0276500 A1 Aug. 31, 2023

(51) Int. Cl.
*H04W 74/00* (2009.01)
*H04W 74/0833* (2024.01)

(52) U.S. Cl.
CPC ..... *H04W 74/002* (2013.01); *H04W 74/0833* (2013.01)

(58) Field of Classification Search
CPC .......................... H04W 74/0833; H04W 74/002

USPC .......................................................... 370/329
See application file for complete search history.

(56) References Cited

U.S. PATENT DOCUMENTS

| 2012/0275305 | A1 | 11/2012 | Lin |
| 2017/0026874 | A1 | 1/2017 | Hassan et al. |
| 2017/0331577 | A1* | 11/2017 | Parkvall ............... H04L 27/2602 |
| 2019/0174554 | A1* | 6/2019 | Deenoo ................ H04B 7/0617 |

FOREIGN PATENT DOCUMENTS

| CN | 102045777 A | 5/2011 |
| CN | 109451835 A | 3/2019 |
| CN | 109803441 A | 5/2019 |
| WO | 2019113753 A1 | 6/2019 |

OTHER PUBLICATIONS

International Search Report of PCT/CN2020/107523 dated Apr. 29, 2021 with English translation, (4p).
Office Action issued to Indian Application No. 202247077203 dated May 30, 2023 with partial English translation, (7p).

* cited by examiner

*Primary Examiner* — Nizam U Ahmed
(74) *Attorney, Agent, or Firm* — Arch & Lake LLP

(57) ABSTRACT

Methods for random access, communication devices, and non-transitory computer storage media thereof are provided. The method applicable to a terminal includes sending a random access request associated with a service type of a multimodal service.

18 Claims, 11 Drawing Sheets

METHOD FOR RANDOM ACCESS, COMMUNICATION DEVICE, AND STORAGE MEDIUM

CROSS-REFERENCE TO RELATED APPLICATION

This application is the U.S. national phase of International Application No. PCT/CN2020/107523 filed on Aug. 6, 2020, the entire content of which is incorporated herein by reference for all purposes.

TECHNICAL FIELD

The disclosure relates to the field of wireless communication technologies, but is not limited to the field of wireless communication technologies, and in particular, to a method for random access, a communication device, and a storage medium.

BACKGROUND

Intelligent interactions occur among intelligent agents (including people and things). The intelligent interactions among the intelligent agents are mostly passive and depend on required inputs. For example, for voice and visual interactions between people and a smart home product, a required input is unimodal. With the evolution of wireless communication technologies, multimodality will become normal, that is, inputs from a plurality of devices or a plurality of inputs from one device are sent to a centralized processing device or function. The centralized processing device or function synthesizes these inputs and obtains one or more outputs that satisfy needs of users. The plurality of outputs can also be a plurality of outputs through the plurality of devices or a plurality of outputs through one device. At present, with the introduction of multimodal services, random access manners may not satisfy high requirements of multimodal services on delay.

SUMMARY

According to a first aspect of the disclosure, a method for random access is provided. The method is applicable to a terminal. The method includes: sending a random access request associated with a service type of a multimodal service.

According to a second aspect of the disclosure, a method for random access is provided. The method is applicable to a base station. The method includes: receiving a random access request, in which the random access request includes a random access request associated with a service type of a multimodal service.

According to a third aspect of the disclosure, a communication device is provided. The communication device includes: a processor; and a memory for storing processor-executable instructions; in which the processor is configured to, when executing the executable instructions, perform the method described in the first or second aspect of the disclosure.

According to a fourth aspect of the disclosure, a non-transitory computer storage medium is provided, in which the computer storage medium stores a computer-executable program, and when the executable program is executed by a processor, the method described in the first or second aspect of the disclosure is performed.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the embodiments of the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of the embodiments of the disclosure, first information is also referred to as second information, and similarly the second information is also referred to as the first information. Depending on the context, for example, the term "if" used herein may be explained as "when" or "while", or "in response to . . . , it is determined that".

For the purpose of conciseness and ease of understanding, the terms "greater than" or "less than" are used herein when characterizing the size relationship. However, those skilled in the art can understand that the term "greater than" also covers the meaning of "greater than or equal to", and "less than" also covers the meaning of "less than or equal to".

Figure 1:
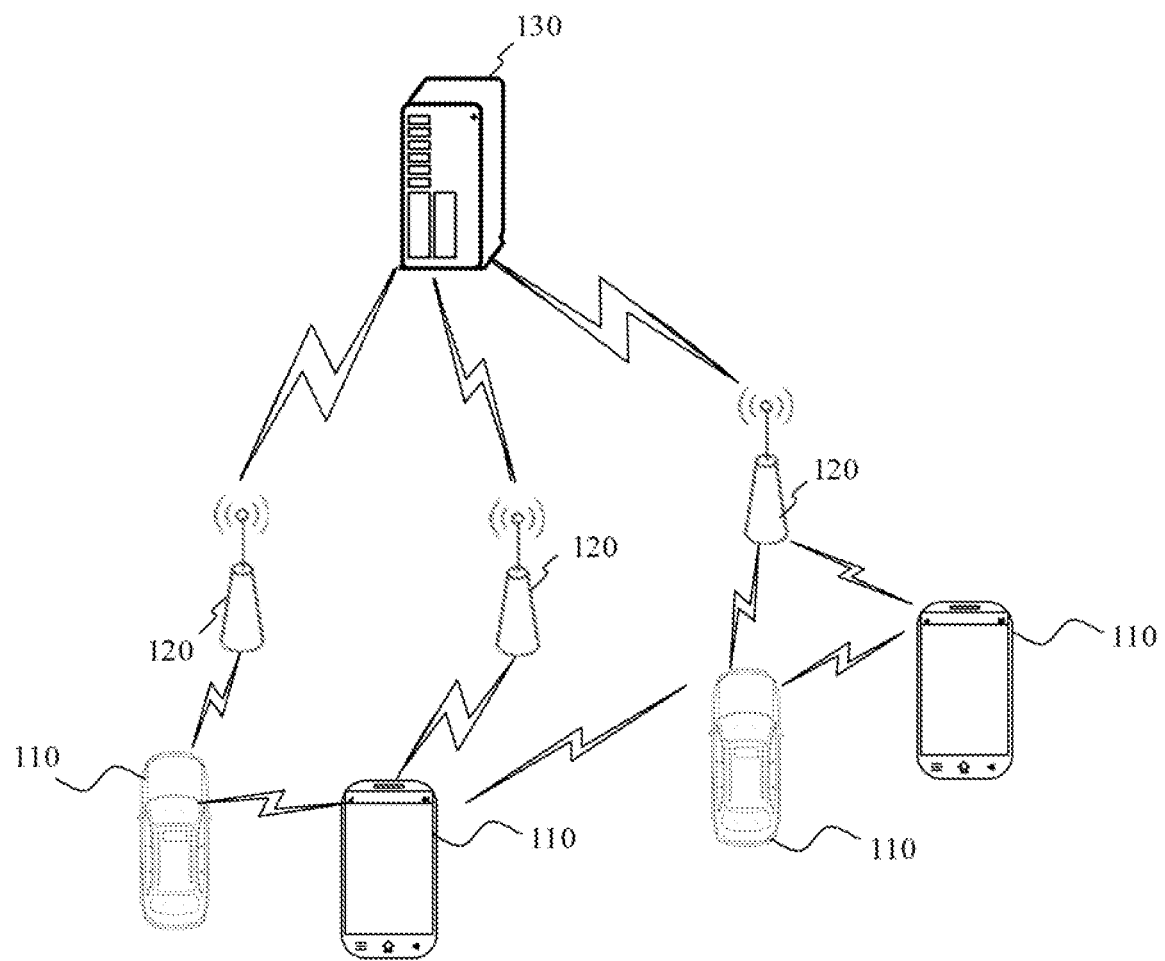
FIG. 1 is a schematic structural diagram of a wireless communication system.

Reference to FIG. 1, FIG. 1 is a schematic structural diagram of a wireless communication system according to some embodiments of the disclosure. As shown in FIG. 1, the wireless communication system is a communication system based on cellular mobile communication technologies, and the wireless communication system may include several user equipments 110 and several base stations 120.

The user equipment 110 may be a device that provides speech and/or data connectivity for the user. The user equipment 110 may communicate with one or more core networks via a radio access network (RAN). The user equipment 110 may be an Internet of Things terminal, such as a sensor device, a mobile phone (or a "cellular" phone), and a computer having an Internet of Things terminal, for example, a fixed, portable, pocket-sized, handheld, computer built-in, or vehicle-mounted device. For example, it may be a station (STA), a subscriber unit, a subscriber station, a mobile station, a mobile, a remote station, an access point, a remote terminal, an access terminal, a user terminal, a user agent, a user device, or a user equipment. Alternatively, the user equipment 110 may also be a device of an unmanned aerial vehicle. Alternatively, the user equipment 110 may also be a vehicle-mounted device, for example, a trip computer having a wireless communication function or a wireless communication device connected to the trip computer. Alternatively, the user equipment 110 may also be a roadside device, for example, a street lamp, a signal lamp, or other roadside device having the wireless communication function.

The base station 120 may be a network side device in the wireless communication system. The wireless communication system may be the 4th generation mobile communication (4G) system, also known as the Long-Term Evolution (LTE) system; or, the wireless communication system may be the 5th generation mobile communication (5G) system, also known as the new radio (NR) system or 5G NR system. Alternatively, the wireless communication system may be the next generation system following the 5G system. The access network in the 5G system can be called the new generation-radio access network (NG-RAN).

The base station 120 may be an evolved node base station (eNB) used in the 4G system. Alternatively, the base station 120 may also be a next generation node base station (gNB) adopting a centralized and distributed architecture in the 5G system. When the base station 120 adopts the centralized and distributed architecture, it usually includes a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a protocol stack of a Physical (PHY) layer. Embodiments of the disclosure may not limit the implementation manner of the base station 120.

A wireless connection may be established between the base station 120 and the terminal 110 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

In some embodiments, an end to end (E2E) link may also be established between the user equipments 110, for example, a vehicle to vehicle (V2V) communication, a vehicle to infrastructure (V2I) communication, and a vehicle to pedestrian (V2P) communication in a vehicle to everything (V2X) communication.

Herein, the above-mentioned user equipment may be regarded as the terminal device of the following embodiments.

In some embodiments, the above wireless communication system may also include a network management device 130.

The base stations 120 are coupled to the network management device 130 respectively. The network management device 130 may be a core network device in the wireless communication system. For example, the network management device 130 may be a mobility management entity (MME) of an evolved packet core (EPC). Alternatively, the network management device may also be other core network devices, such as a serving gateway (SGW), a public data network gateway (PGW), a policy and charging rules function (PCRF) unit, or a home subscriber server (HSS). The implementation form of the network management device 130 is not limited in the embodiments of the disclosure.

In order to facilitate the understanding of any embodiment of the disclosure, first, an application scenario of a multimodal service is described.

Figure 2:
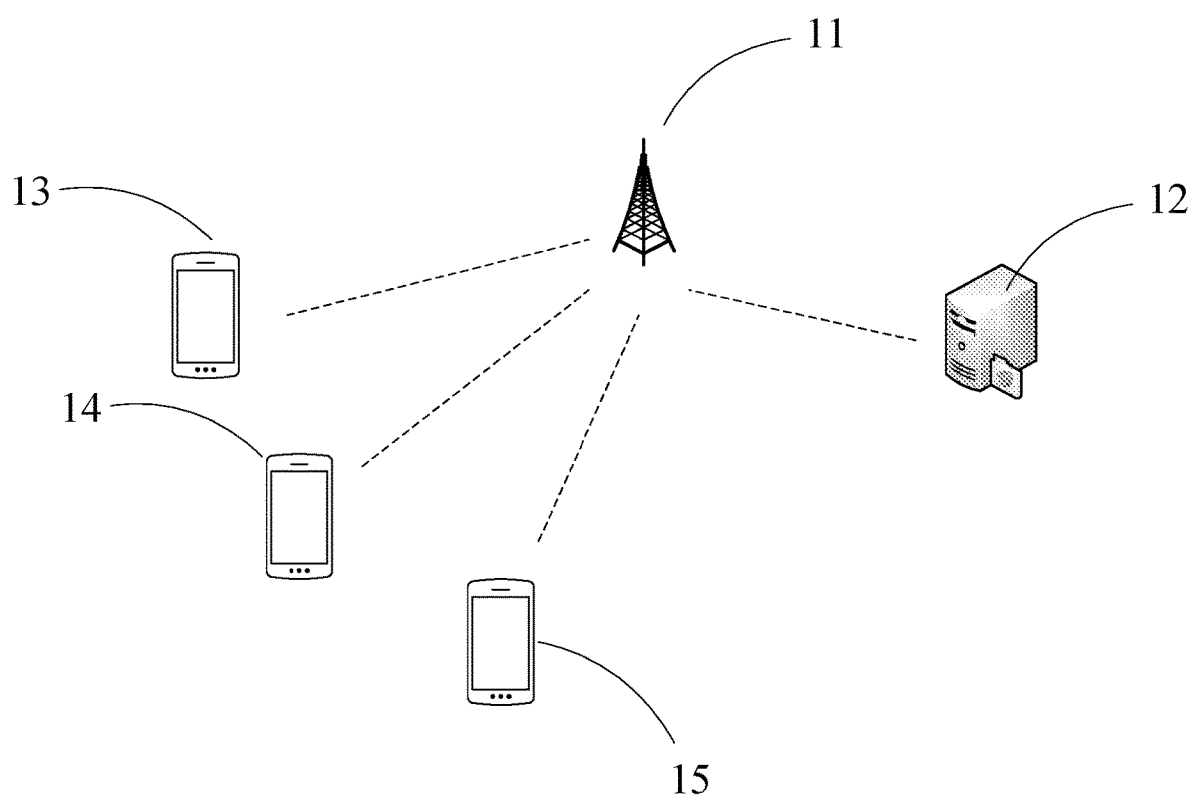
FIG. 2 is a flowchart of an intelligent interaction scenario according to some embodiments.

Referring to FIG. 2, in some embodiments, a multimodal service system includes a base station 11, a centralized processing device 12, a terminal 13, a terminal 14, and a terminal 15. In some embodiments, the terminal 13 and the terminal 14 are input devices for multimodal services, the centralized processing device 12 is a processing device for multimodal services, and the terminal 15 is an output device for multimodal services. Herein, both the terminal 13 and/or the terminal 14 can input data in multiple modalities, for example, the terminal 13 can input data in two modalities. Herein, the centralized processing device 12 may process the data input by the terminal 13 and the terminal 14 and then send the processed data to the terminal 15. Herein, the data sent to the terminal 15 may be data output in multiple modalities. Herein, the centralized processing device 12 may use a machine learning algorithm to process the input data, for example, use a neural network algorithm to process the input data.

Herein, before the terminal 13 and/or the terminal 14 send data to the centralized processing device 12 or before the centralized processing device 12 sends data to the terminal 15, the terminal 13, the terminal 14, the terminal 15, and the centralized processing device 12 all need to establish a radio resource control (RRC) connection with the base station 11. When establishing the RRC connection, random access is required. Most multimodal services have high requirements on wireless communication delay. If the delay caused by random access of multimodal communication terminals can be reduced, the user experience will be improved.

Figure 3:
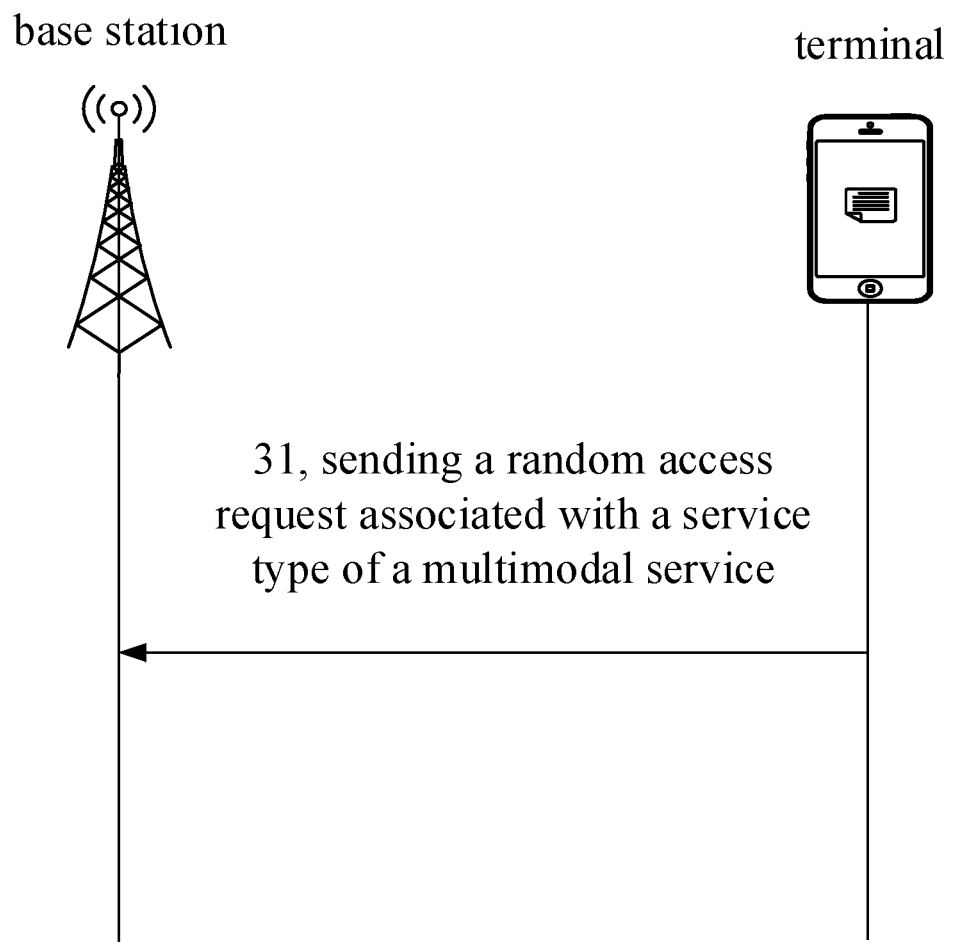
FIG. 3 is a flowchart of a method for random access according to some embodiments.

As shown in FIG. 3, a method for random access is provided in some embodiments. The method is applicable to a terminal. The method includes the following.

Step 31, a random access request associated with a service type of a multimodal service is sent.

In some embodiments, the random access request is a first message (Msg1) for random access or a random access preamble.

The terminal may be, but is not limited to, a mobile phone, a wearable device, a vehicle-mounted terminal, a road side unit (RSU), a smart home terminal, an industrial sensing device and/or a medical device, or the like.

In some embodiments, the terminal may be any one of multiple terminals corresponding to the multimodal service.

For example, the terminal may be the terminal 12 in FIG. 2 for data input of multimodal services. The terminal may also be the terminal 15 in FIG. 2 for data output of multimodal services.

In some embodiments, the base station may receive the random access request. The base station is an interface device for the terminal to access the network. The base station may be various types of base stations, for example, a base station of a 3rd-generation mobile communication (3G) network, a base station of a 4G network, a base station of a 5G network, or other evolved base station.

In some embodiments, the multimodal service may be a service for data input in multiple modalities and/or data output in multiple modalities. Herein, data input in each modality may be performed through multiple terminals, or data input in each modality may be performed through one terminal. Herein, data output in each modality may be performed through multiple terminals, or data output in each modality may be performed through one terminal. Herein, data in one modality may be data having predetermined features. For example, data with pose features can be data in one modality, and data with face features can be data in another modality.

In some embodiments, the service type of the multimodal service may be determined according to the communication delay of the multimodal service. For example, when the communication delay of the multimodal service is less than a first threshold, the service type of the multimodal service is a first service type; when the communication delay of the multimodal service is greater than the first threshold and less than a second threshold, the service type of the multimodal service is a second service type; when the communication delay of the multimodal service is greater than the second threshold, the service type of the multimodal service is a third service type. Herein, the first threshold is smaller than the second threshold.

In some embodiments, the service type of the multimodal service may be determined according to the service priority of the multimodal service. For example, when the service priority of the multimodal service is high priority, the service type of the multimodal service is the first service type; when the service priority of the multimodal service is low priority, the service type of the multimodal service is the second service type.

In some embodiments, in response to receiving a paging signaling sent by the base station, the random access request associated with the service type of the multimodal service is sent. Herein, the terminal of the multimodal service triggers the random access procedure by sending the random access request to establish the RRC connection to realize the wireless communication of the multimodal service. Herein, the terminal may be in an RRC idle state. Herein, the random access request may be an RRC connection establishment request or an RRC connection recovery request.

In some embodiments, the paging signaling carries random access information of the terminal for the multimodal service access. The terminal uses the random access information to send the random access request associated with the service type of the multimodal service. Herein, the random access information may include time-frequency domain resources and/or preamble sequences for random access. Herein, using the random access information carried in the paging signaling to send the random access request can reduce the interference caused by the resource collision when different terminals use resources when the terminal transmits data.

In some embodiments, the multimodal service may be a multi-party authentication payment service. For example, if terminal A needs to complete the payment service, it needs to obtain the face data of terminal B and the voice data of terminal C for authentication. When terminal A performs the payment service, terminal A may send an authentication request to the base station through the core network. After receiving the authentication request, the base station sends the paging signaling to terminal B in the idle state and terminal C in the idle state of the payment service. After receiving the paging signaling, terminal B and terminal C send the random access request associated with the service type of the multimodal service, and establish the RRC connection with the base station. Then, terminal B sends the face data to the base station, and terminal C sends the voice data to the base station.

In some embodiments, the terminal may send the random access request associated with the service type of the multimodal service when the output data of the multimodal service to be transmitted needs to be sent to the base station. In this way, the terminal can send the output data of the multimodal service to be transmitted to the base station in time, and the base station sends the output data of the multimodal service to the centralized processing device for processing.

In some embodiments, when a multimodal event occurs, the random access request associated with the service type of the multimodal service is sent.

In some embodiments, the multimodal event may occur when the current time is the set time. For example, the security service is the multimodal service. In the security system, when the terminal arrives at the set time, it needs to transmit voice data and image data to multiple processing devices of the security service, and will send the random access request associated with the service type of the multimodal service.

In some embodiments, multimodal services of different service types can be distinguished by IDs. For example, the ID of the multimodal service of the first service type is "001"; and the ID of the multimodal service of the second service type is "010".

In some embodiments, IDs of multimodal services of different service types are different and the random access request is associated with the ID of the multimodal service. For example, the ID of the multimodal service related to intelligent driving is "001", and the random access request of the multimodal service related to intelligent driving carries the ID information of "001"; the ID of the multimodal service related to telemedicine is "010", and the random access request of the multimodal service related to telemedicine carries the ID information of "010".

In some embodiments, the random access request is associated with the ID of the multimodal service includes: the random access request is scrambled by the ID; or, the random access request carries the ID.

In some embodiments, the terminal scrambles the random access request by using the ID, and after receiving the random access request, the base station can descramble the random access request by using different IDs. When descrambling is successful, it is determined that the ID used when descrambling is successful is the ID associated with the random access request. Herein, ID may be a sequence of binary numbers.

For example, multimodal service A whose ID is the first ID needs to initiate random access, and the terminal uses the first ID to scramble the random access request. After receiving the random access request scrambled with the first ID, the base station will use the first ID, the second ID, and the third ID to descramble the access request. Since the descrambling can be successful only by using the first ID, the base station determines that the first ID is the ID associated with the random access request. The multimodal service corresponding to this ID is the multimodal service for which the terminal requests random access.

In some embodiments, the random access request carries the ID of the multimodal service, and the base station can decode the random access request after receiving the random access request. The base station decodes the ID carried by the random access request, thereby determining that the first ID is the ID associated with the random access request, and the multimodal service corresponding to the first ID is the multimodal service for which the terminal requests random access. Herein, the ID may be a sequence of binary numbers.

For example, multimodal service B whose ID is the first ID needs to initiate random access, and the random access request sent to the base station carries the first ID. After the base station receives the random access request, the random access request can be decoded, and if the first ID carried by the random access request is decoded, it can be determined that the first ID is the ID associated with the random access request, and the multimodal service corresponding to the first ID is multimodal service B for which the terminal requests random access.

Herein, since the random access request is associated with the ID of the multimodal service, after receiving the random access request, the base station can determine the service type of the multimodal service based on the ID. The base station may determine, according to the service type of the multimodal service, whether it is a multimodal service that the base station preferentially allows access to, so as to determine a random response operation for the random access request. For example, a random access response (RAR) to the random access request may be sent, so that the terminal can quickly access the network based on the RAR.

In some embodiments, the ID is temporarily allocated for the multimodal service; or, the ID is pre-allocated for the multimodal service.

In some embodiments, it may be temporarily allocated for the multimodal service when the multimodal service is required. For example, the ID may be temporarily allocated for the multimodal service when the centralized processing device needs multiple terminals of the multimodal service in the RRC idle state to input data.

In other embodiments, the temporary allocation to the multimodal service may be the temporarily allocation to the multimodal service when a multimodal event occurs. For example, the ID may be temporarily allocated for the multimodal service when the current time is the time set when the multimodal event occurs.

Herein, when the multimodal service is initiated, the ID may be temporarily allocated, and when the multimodal service ends, the temporarily allocated ID may be released. In this way, it is possible to reduce the situation that the resource of the ID is always occupied, so that the allocation of the ID is more flexible, and the use of the ID is more efficient.

In some embodiments, the ID may be allocated for the multimodal service when the terminal of the multimodal service establishes the RRC connection with the base station.

In some embodiments, the ID may be pre-allocated, so that the terminal can realize the storage of the pre-allocated ID, and when the ID needs to be used, it can be obtained directly from the storage area, which reduces the wireless resource consumption of the ID allocated by the network side.

In some embodiments, the ID is allocated by a core network or by an access network.

In some embodiments, the ID may be allocated by the core network when the centralized processing device sends to page the terminal of the multimodal service to the base station through the core network.

In some embodiments, the ID is allocated by the access network and may be allocated for the multimodal service before the base station sends the paging signaling.

In some embodiments, the random access request is associated with the ID of the multimodal service includes: a random access preamble of the random access request has a corresponding relationship with the multimodal service.

In some embodiments, different random access preambles are allocated to different multimodal services in advance. For example, the random access preambles allocated to the multimodal service of the first service type are preamble 1, preamble 2, and preamble 3; the random access preambles allocated to the multimodal service of the second service type is preamble 4, preamble 5, and preamble 6. When random access is initiated for the multimodal service of the first service type, one preamble will be selected from preamble 1, preamble 2, and preamble 3 as the preamble of the random access request. When random access is initiated for the multimodal service of the second service type, one preamble will be selected from preamble 4, preamble 5, and preamble 6 as the preamble of the random access request. Herein, the mapping relationship between the random access preamble of the random access request and the multimodal service may be broadcast to the terminal through the base station. In this way, when the base station receives the random access request, it can determine the service type of the multimodal service associated with the random access request according to the random access preamble.

In some embodiments, the terminal pre-stores the mapping relationship between the random access preamble of the random access request and the multimodal service. For example, the terminal stores the mapping relationship between the multimodal service of the first service type and the random access preamble set, where the random access preamble set includes preamble 1, preamble 2, and preamble 3. In this way, when the terminal initiates a multimodal service of a certain service type, it can determine the random access preamble to be used according to the stored mapping relationship.

In some embodiments, since the random access request is associated with the service type of the multimodal service, after receiving the random access request, the base station can determine the service type of the multimodal service request by the terminal to access according to the random access request and send an RAR for the multimodal service of the service type. Compared with the manner in which the RAR for the multimodal service of the service type may not be sent because the terminal sends the random access request that is not associated with the service type of the multimodal service, this implementation, for example, may send the RAR for the multimodal service of the service type. In this way, it enables the multimodal service to access the network quickly, reduces the situation that the multimodal service of the service type may not access the network for a long time due to the RAR sent untargeted, and reduces the delay of the multimodal service.

Figure 4:
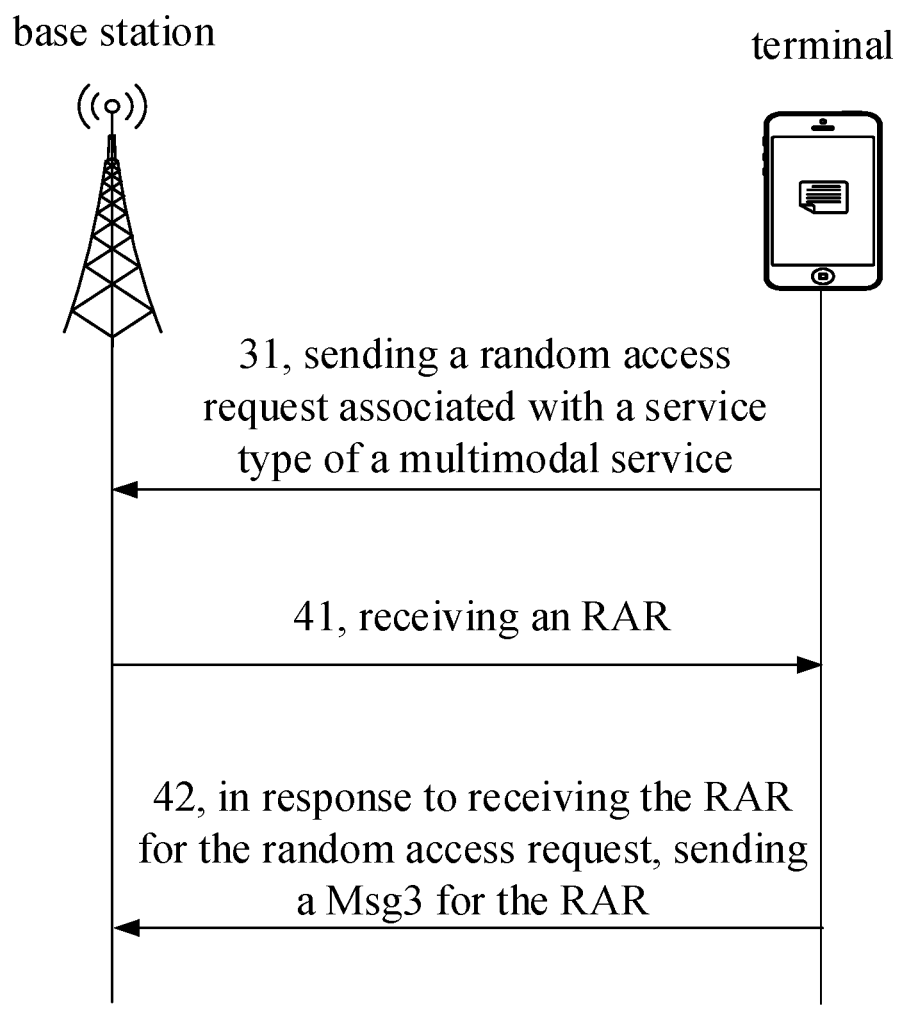
FIG. 4 is a flowchart of a method for random access according to some embodiments.

As shown in FIG. 4, a method for random access is provided in some embodiments. The method further includes the following.

Step 41, an RAR is received.

Step 42, in response to receiving the RAR for the random access request, a third message (Msg3) for the RAR is sent.

In some embodiments, the RAR may be an RAR sent solely for the random access request sent by the terminal. Herein, the RAR may carry type information of the service type of the multimodal service associated with the random access request. After receiving the RAR carrying the type information, the terminal of sending the random access request may perform a subsequent random access process based on resources indicated by the RAR.

In some embodiments, the RAR may be an RAR sent for random access requests sent by multiple terminals. Herein, the RAR carries information associated with the multimodal service of the terminal. Herein, the terminals receive multiple random access requests, and the RAR may carry type information of service types of multiple multimodal services associated with the multiple random access requests. After receiving the RAR, multiple terminals of sending the random access requests may perform subsequent random access procedures based on resources indicated by the RAR.

In some embodiments, the RAR for the random access request includes: the RAR carrying an ID of the multimodal service; and/or, the RAR carrying type information of the service type to which the multimodal service belongs.

In some embodiments, the ID is carried in a medium access control (MAC) header of a MAC protocol data unit (PDU) of the RAR or carried in a MAC payload of the MAC PDU of the RAR.

In some embodiments, the type information is carried in a MAC header of a MAC PDU of the RAR or carried in a MAC payload of the MAC PDU of the RAR.

In some embodiments, carried in the MAC header of the MAC PDU of the RAR includes: carried in a newly added multimodal identity (MMID) subheader in the MAC header of the MAC PDU of the RAR; or, carried in one of an extension field, a type field, and a random access identification field in the MAC header of the MAC PDU of the RAR.

In some embodiments, carried in the MAC payload of the MAC PDU of the RAR includes: carried in an existing MAC payload of the MAC PDU of the RAR; or, carried in a newly added MAC payload of the MAC PDU of the RAR.

In some embodiments, different multimodal services can be differentiated by IDs. For example, the ID of the first multimodal service is "001"; the ID of the second multimodal service is "010".

In some embodiments, the type information of multimodal services of different service types is different. For example, the type information of the multimodal service related to intelligent driving is "A"; the type information of the multimodal service related to telemedicine is "B".

In some embodiments, if an RAR is sent for random access requests sent by multiple terminals, the RAR may carry IDs of multiple multimodal services that the base station allows for random access.

In some embodiments, if an RAR is sent for random access requests sent by multiple terminals, the RAR may carry type information of multiple multimodal services that the base station allows for random access.

In some embodiments, the RAR may carry both the ID of the multimodal service and the type information of the service type to which the multimodal service belongs. For example, the multimodal service is a remote control service related to a driving service. Herein, the type information of the driving service is "A", and the ID of the remote control service related to the driving service is "001", and the RAR can carry both "A" and "001".

In some embodiments, the RAR carries the time-frequency resource for sending the Msg3. In this way, the terminal can send the Msg3 by using the time-frequency resource carried by the RAR for sending the Msg3, thus reducing interference when different terminals send the Msg3.

In some embodiments, the Msg3 for the RAR includes: the Msg3 carrying an ID of the multimodal service; and/or, the Msg3 carrying type information of the service type to which the multimodal service belongs.

In some embodiments, different multimodal services can be differentiated by IDs. For example, the ID of the first multimodal service is "001"; the ID of the second multimodal service is "010".

In some embodiments, the type information of multimodal services of different service types is different. For example, the type information of the multimodal service related to intelligent driving is "A"; the type information of the multimodal service related to telemedicine is "B".

In some embodiments, the Msg3 may simultaneously carry the ID of the multimodal service and the type information of the service type to which the multimodal service belongs. For example, the multimodal service is the remote control service related to the driving service. Herein, the type information of the driving service is "A", and the ID of the remote control service related to the driving service is "001", and the Msg3 carry both "A" and "001".

Herein, the Msg3 carries the ID of the multimodal service and/or the type information of the service type to which the multimodal service belongs. In this way, after receiving the Msg3, the base station can determine the service type of the multimodal service of the terminal sending the Msg3 according to the Msg3.

Figure 5:
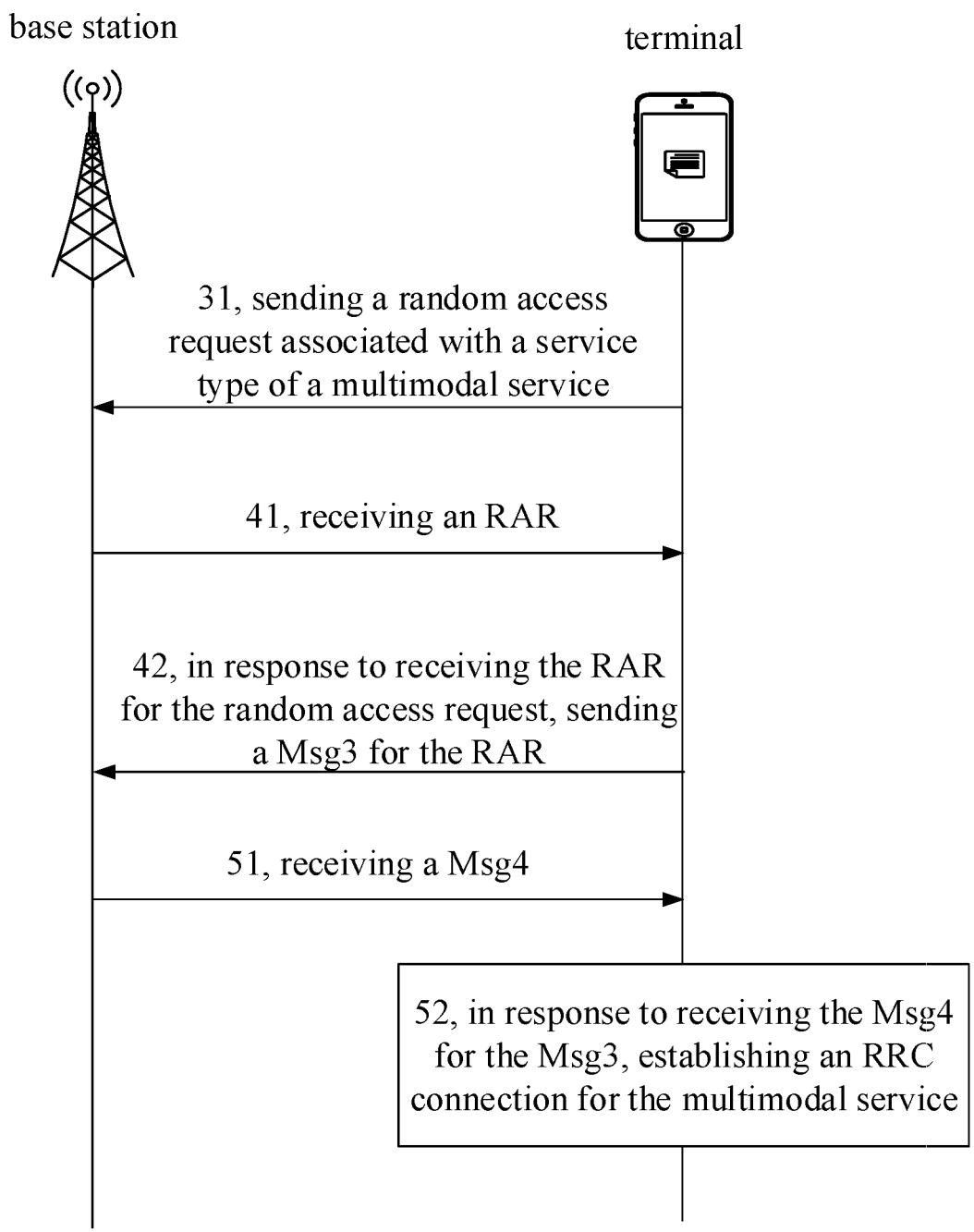
FIG. 5 is a flowchart of a method for random access according to some embodiments.

As shown in FIG. 5, some embodiments provide a method for random access. The method further includes the following.

Step 51, a fourth message (Msg4) is received.

Step 52, in response to receiving the Msg4 for the Msg3, an RRC connection for the multimodal service is established.

In some embodiments, the Msg4 for the Msg3 includes: the Msg4 carrying type information of the service type of the multimodal service; and/or, the Msg4 carrying an ID of the multimodal service.

In some embodiments, different multimodal services can be differentiated by IDs. For example, the ID of the first multimodal service is "001"; the ID of the second multimodal service is "010".

In some embodiments, the type information of multimodal services of different service types is different. For example, the type information of the multimodal service related to intelligent driving is "A"; the type information of the multimodal service related to telemedicine is "B".

In some embodiments, the Msg4 may simultaneously carry the ID of the multimodal service and the type information of the service type to which the multimodal service belongs. For example, the multimodal service is a remote control service related to a driving service. Herein, the type information of the driving service is "A", and the ID of the remote control service related to the driving service is "001", and then the Msg4 carries both "A" and "001".

Herein, the Msg4 carries the ID of the multimodal service and/or the type information of the service type to which the multimodal service belongs. After receiving the Msg4, the terminal decodes the Msg4. If the ID of the multimodal service of the terminal and/or the type information of the service type of the multimodal service are decoded, it can be determined that the base station allows the terminal to establish the (RRC connection with the base station for the multimodal service.

Figure 6:
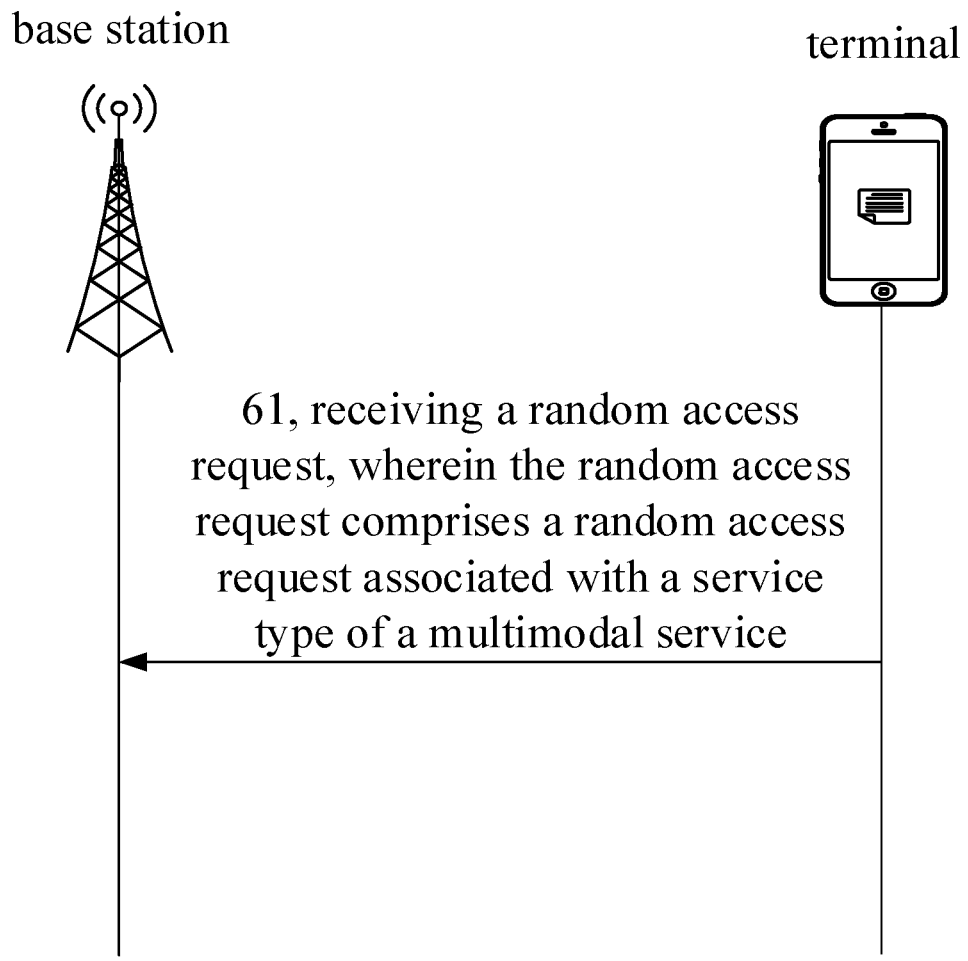
FIG. 6 is a flowchart of a method for random access according to some embodiments.

As shown in FIG. 6, some embodiments provide a method for random access. The method is applicable to a base station. The method includes the following.

Step 61, a random access request is received, in which the random access request includes a random access request associated with a service type of a multimodal service.

In some embodiments, the random access request is a Msg1 for random access or a random access preamble.

The terminal may be, but is not limited to, a mobile phone, a wearable device, a vehicle-mounted terminal, an RSU, a smart home terminal, an industrial sensing device and/or a medical device, or the like.

In some embodiments, the terminal may be any one of multiple terminals corresponding to the multimodal service. For example, the terminal may be the terminal 12 in FIG. 2 for data input of multimodal services. The terminal may also be the terminal 15 in FIG. 2 for data output of multimodal services.

The base station is an interface device for the terminal to access the network. The base station may be various types of base stations, for example, a base station of a 3G network, a base station of a 4G network, a base station of a 5G network, or other evolved base station.

In some embodiments, the multimodal service may be a service for data input in multiple modalities and/or data output in multiple modalities. Herein, data input in each modality may be performed through multiple terminals, or data input in each modality may be performed through one terminal. Herein, data output in each modality may be performed through multiple terminals, or data output in each modality may be performed through one terminal. Herein, data in one modality may be data having predetermined features. For example, data with pose features can be data in one modality, and data with face features can be data in another modality.

In some embodiments, the service type of the multimodal service may be determined according to the communication delay of the multimodal service. For example, when the communication delay of the multimodal service is less than a first threshold, the service type of the multimodal service is a first service type; when the communication delay of the multimodal service is greater than the first threshold and less than a second threshold, the service type of the multimodal service is a second service type; when the communication delay of the multimodal service is greater than the second threshold, the service type of the multimodal service is a third service type. Herein, the first threshold is smaller than the second threshold.

In some embodiments, the service type of the multimodal service may be determined according to the service priority of the multimodal service. For example, when the service priority of the multimodal service is high priority, the service type of the multimodal service is the first service type; when the service priority of the multimodal service is low priority, the service type of the multimodal service is the second service type.

In some embodiments, in response to receiving a paging signaling sent by the base station, the random access request associated with the service type of the multimodal service is sent by the terminal. Herein, the terminal of the multimodal service triggers the random access procedure by sending the random access request to establish the RRC connection to realize the wireless communication of the multimodal service. Herein, the terminal may be in an RRC idle state. Herein, the random access request may be an RRC connection establishment request or an RRC connection recovery request.

In some embodiments, the paging signaling carries random access information of the terminal for the multimodal service access. The terminal uses the random access information to send the random access request associated with the service type of the multimodal service. Herein, the random access information may include time-frequency domain resources and/or preamble sequences for random access. Herein, using the random access information carried in the paging signaling to send the random access request can reduce the interference caused by the resource collision when different terminals use resources when the terminal transmits data.

In some embodiments, the multimodal service may be a multi-party authentication payment service. For example, if terminal A needs to complete the payment service, it needs to obtain the face data of terminal B and the voice data of terminal C for authentication. When terminal A performs the payment service, terminal A may send an authentication request to the base station through the core network. After receiving the authentication request, the base station sends the paging signaling to terminal B in the idle state and terminal C in the idle state of the payment service. After receiving the paging signaling, terminal B and terminal C send the random access request associated with the service type of the multimodal service, and establish the RRC connection with the base station. Then, terminal B sends the face data to the base station, and terminal C sends the voice data to the base station.

In some embodiments, the terminal may send the random access request associated with the service type of the multimodal service when the output data of the multimodal service to be transmitted needs to be sent to the base station. In this way, the terminal can send the output data of the multimodal service to be transmitted to the base station in time, and the base station sends the output data of the multimodal service to the centralized processing device for processing.

In some embodiments, when a multimodal event occurs, the random access request associated with the service type of the multimodal service is sent.

In some embodiments, the multimodal event may occur when the current time is the set time. For example, the security service is the multimodal service. In the security system, when the terminal arrives at the set time, it needs to transmit voice data and image data to multiple processing devices of the security service, and will send the random access request associated with the service type of the multimodal service.

In some embodiments, multimodal services of different service types can be distinguished by IDs. For example, the ID of the multimodal service of the first service type is "001"; and the ID of the multimodal service of the second service type is "010".

In some embodiments, IDs of multimodal services of different service types are different and the random access request is associated with the ID of the multimodal service. For example, the ID of the multimodal service related to intelligent driving is "001", and the random access request of the multimodal service related to intelligent driving carries the ID information of "001"; the ID of the multimodal service related to telemedicine is "010", and the random access request of the multimodal service related to telemedicine carries the ID information of "010".

In some embodiments, the random access request is associated with the ID of the multimodal service includes: the random access request is scrambled by the ID; or, the random access request carries the ID.

In some embodiments, the terminal scrambles the random access request by using the ID, and after receiving the random access request, the base station can descramble the random access request by using different IDs. When descrambling is successful, it is determined that the ID used when descrambling is successful is the ID associated with the random access request. Herein, ID may be a sequence of binary numbers.

For example, multimodal service A whose ID is the first ID needs to initiate random access, and the terminal uses the first ID to scramble the random access request. After receiving the random access request scrambled with the first ID, the base station will use the first ID, the second ID, and the third ID to descramble the access request. Since the descrambling can be successful only by using the first ID, the base station determines that the first ID is the ID associated with the random access request. The multimodal service corresponding to this ID is the multimodal service for which the terminal requests random access.

In some embodiments, the random access request carries the ID of the multimodal service, and the base station can decode the random access request after receiving the random access request. The base station decodes the ID carried by the random access request, thereby determining that the first ID is the ID associated with the random access request, and the multimodal service corresponding to the first ID is the multimodal service for which the terminal requests random access. Herein, the ID may be a sequence of binary numbers.

For example, multimodal service B whose ID is the first ID needs to initiate random access, and the random access request sent to the base station carries the first ID. After the base station receives the random access request, the random access request can be decoded, and if the first ID carried by the random access request is decoded, it can be determined that the first ID is the ID associated with the random access request, and the multimodal service corresponding to the first ID is multimodal service B for which the terminal requests random access.

Herein, since the random access request is associated with the ID of the multimodal service, after receiving the random access request, the base station can determine the service type of the multimodal service based on the ID. The base station may determine, according to the service type of the multimodal service, whether it is a multimodal service that the base station preferentially allows access to, so as to determine a random response operation for the random access request. For example, a random access response (RAR) to the random access request may be sent, so that the terminal can quickly access the network based on the RAR.

In some embodiments, the ID is temporarily allocated for the multimodal service; or, the ID is pre-allocated for the multimodal service.

In some embodiments, it may be temporarily allocated for the multimodal service when the multimodal service is required. For example, the ID may be temporarily allocated for the multimodal service when the centralized processing device needs multiple terminals of the multimodal service in the RRC idle state to input data.

In other embodiments, the temporary allocation to the multimodal service may be the temporarily allocation to the multimodal service when a multimodal event occurs. For example, the ID may be temporarily allocated for the multimodal service when the current time is the time set when the multimodal event occurs.

Herein, when the multimodal service is initiated, the ID may be temporarily allocated, and when the multimodal service ends, the temporarily allocated ID may be released. In this way, it is possible to reduce the situation that the resource of the ID is always occupied, so that the allocation of the ID is more flexible, and the use of the ID is more efficient.

In some embodiments, the ID may be allocated for the multimodal service when the terminal of the multimodal service establishes the RRC connection with the base station.

In some embodiments, the ID may be pre-allocated, so that the terminal can realize the storage of the pre-allocated ID, and when the ID needs to be used, it can be obtained directly from the storage area, which reduces the wireless resource consumption of the ID allocated by the network side.

In some embodiments, the ID is allocated by a core network or by an access network.

In some embodiments, the ID may be allocated by the core network when the centralized processing device sends to page the terminal of the multimodal service to the base station through the core network.

In some embodiments, the ID is allocated by the access network and may be allocated for the multimodal service before the base station sends the paging signaling.

In some embodiments, the random access request is associated with the ID of the multimodal service includes: a random access preamble of the random access request has a corresponding relationship with the multimodal service.

In some embodiments, different random access preambles are allocated to different multimodal services in advance. For example, the random access preambles allocated to the multimodal service of the first service type are preamble 1, preamble 2, and preamble 3; the random access preambles allocated to the multimodal service of the second service type is preamble 4, preamble 5, and preamble 6. When random access is initiated for the multimodal service of the first service type, one preamble will be selected from preamble 1, preamble 2, and preamble 3 as the preamble of the random access request. When random access is initiated for the multimodal service of the second service type, one preamble will be selected from preamble 4, preamble 5, and preamble 6 as the preamble of the random access request. Herein, the mapping relationship between the random access preamble of the random access request and the multimodal service may be broadcast to the terminal through the base station. In this way, when the base station receives the random access request, it can determine the service type of the multimodal service associated with the random access request according to the random access preamble.

In some embodiments, the terminal pre-stores the mapping relationship between the random access preamble of the random access request and the multimodal service. For example, the terminal stores the mapping relationship between the multimodal service of the first service type and the random access preamble set, where the random access preamble set includes preamble 1, preamble 2, and preamble 3. In this way, when the terminal initiates a multimodal service of a certain service type, it can determine the random access preamble to be used according to the stored mapping relationship.

In some embodiments, since the random access request is associated with the service type of the multimodal service, after receiving the random access request, the base station can determine the service type of the multimodal service request by the terminal to access according to the random access request and send an RAR for the multimodal service of the service type. Compared with the manner in which the RAR for the multimodal service of the service type may not be sent because the terminal sends the random access request that is not associated with the service type of the multimodal service, this implementation, for example, may send the RAR for the multimodal service of the service type. In this way, it enables the multimodal service to access the network quickly, reduces the situation that the multimodal service of the service type may not access the network for a long time due to the RAR sent untargeted, and reduces the delay of the multimodal service.

Figure 7:
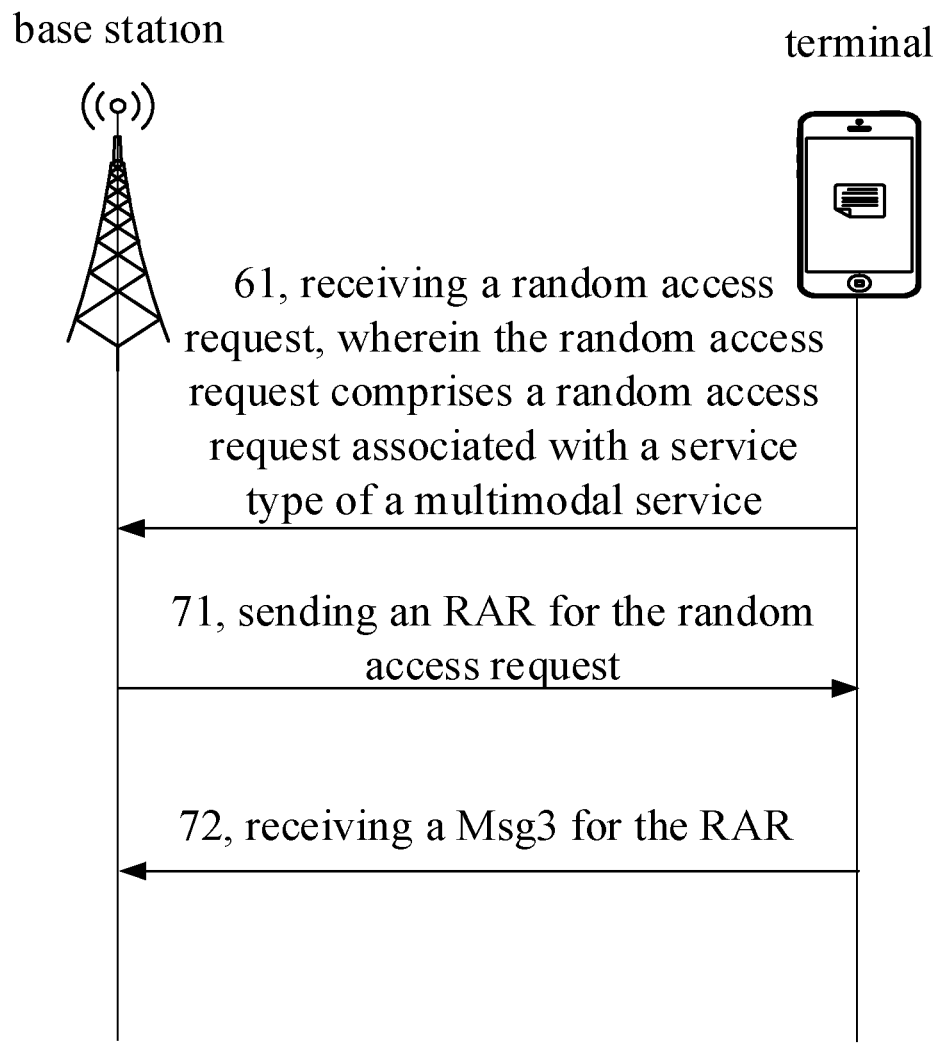
FIG. 7 is a flowchart of a method for random access according to some embodiments.

As shown in FIG. 7, some embodiments provide a method for random access. The method further includes the following.

Step 71, an RAR is sent for the random access request.

Step 72, a Msg3 for the RAR is received.

In some embodiments, the RAR may be an RAR sent solely for the random access request sent by the terminal. Herein, the RAR may carry type information of the service type of the multimodal service associated with the random access request. After receiving the RAR carrying the type information, the terminal of sending the random access request may perform a subsequent random access process based on resources indicated by the RAR.

In some embodiments, the RAR may be an RAR sent for random access requests sent by multiple terminals. Herein, the RAR carries information associated with the multimodal service of the terminal. Herein, the terminals receive multiple random access requests, and the RAR may carry type information of service types of multiple multimodal services associated with the multiple random access requests. After receiving the RAR, multiple terminals of sending the random access requests may perform subsequent random access procedures based on resources indicated by the RAR.

In some embodiments, the RAR for the random access request includes: the RAR carrying an ID of the multimodal service; and/or, the RAR carrying type information of the service type to which the multimodal service belongs.

In some embodiments, the type information of multimodal services of different service types is different. For example, the type information of the multimodal service related to intelligent driving is "A"; the type information of the multimodal service related to telemedicine is "B".

In some embodiments, the type information is carried in a medium access control (MAC) header of a MAC protocol data unit (PDU) of the RAR or carried in a MAC payload of the MAC PDU of the RAR.

In some embodiments, the MMID subheader may be reset in the MAC header to carry the type information. It is also possible to modify the extension field, the type field, or the random access identification field to carry the type information.

In some embodiments, the MAC payload may be reconfigured to carry the type information. It is also possible to modify the MAC payload to carry the type information.

In some embodiments, the RAR for the random access request includes: the RAR carrying an ID of the multimodal service.

In some embodiments, different multimodal services can be differentiated by IDs. For example, the ID of the first multimodal service is "001"; the ID of the second multimodal service is "010".

In some embodiments, the ID is carried in a MAC header of a MAC PDU of the RAR or carried in a MAC payload of the MAC PDU of the RAR.

In some embodiments, carried in the MAC header of the MAC PDU of the RAR includes: carried in a newly added MMID subheader in the MAC header of the MAC PDU of the RAR; or, carried in one of an extension field, a type field, and a random access identification field set in the MAC header of the MAC PDU of the RAR.

In some embodiments, carried in the MAC payload of the MAC PDU of the RAR includes: carried in an existing MAC payload of the MAC PDU of the RAR; or, carried in a newly added MAC payload of the MAC PDU of the RAR.

In some embodiments, if an RAR is sent for random access requests sent by multiple terminals, the RAR may carry IDs of multiple multimodal services that the base station allows for random access.

In some embodiments, if an RAR is sent for random access requests sent by multiple terminals, the RAR may carry type information of multiple multimodal services that the base station allows for random access.

In some embodiments, the RAR may carry both the ID of the multimodal service and the type information of the service type to which the multimodal service belongs. For example, the multimodal service is a remote control service related to a driving service. Herein, the type information of the driving service is "A", and the ID of the remote control service related to the driving service is "001", and the RAR can carry both "A" and "001".

In some embodiments, the RAR carries the time-frequency resource for sending the Msg3. In this way, the terminal can send the Msg3 by using the time-frequency resource carried by the RAR for sending the Msg3, thus reducing interference when different terminals send the Msg3.

In some embodiments, the Msg3 for the RAR includes: the Msg3 carrying an ID of the multimodal service; and/or, the Msg3 carrying type information of the service type to which the multimodal service belongs.

In some embodiments, different multimodal services can be differentiated by IDs. For example, the ID of the first multimodal service is "001"; the ID of the second multimodal service is "010".

In some embodiments, the type information of multimodal services of different service types is different. For example, the type information of the multimodal service related to intelligent driving is "A"; the type information of the multimodal service related to telemedicine is "B".

In some embodiments, the Msg3 may simultaneously carry the ID of the multimodal service and the type information of the service type to which the multimodal service belongs. For example, the multimodal service is the remote control service related to the driving service. Herein, the type information of the driving service is "A", and the ID of the remote control service related to the driving service is "001", and the Msg3 carry both "A" and "001".

Herein, the Msg3 carries the ID of the multimodal service and/or the type information of the service type to which the multimodal service belongs. In this way, after receiving the Msg3, the base station can determine the service type of the multimodal service of the terminal sending the Msg3 according to the Msg3.

Figure 8:
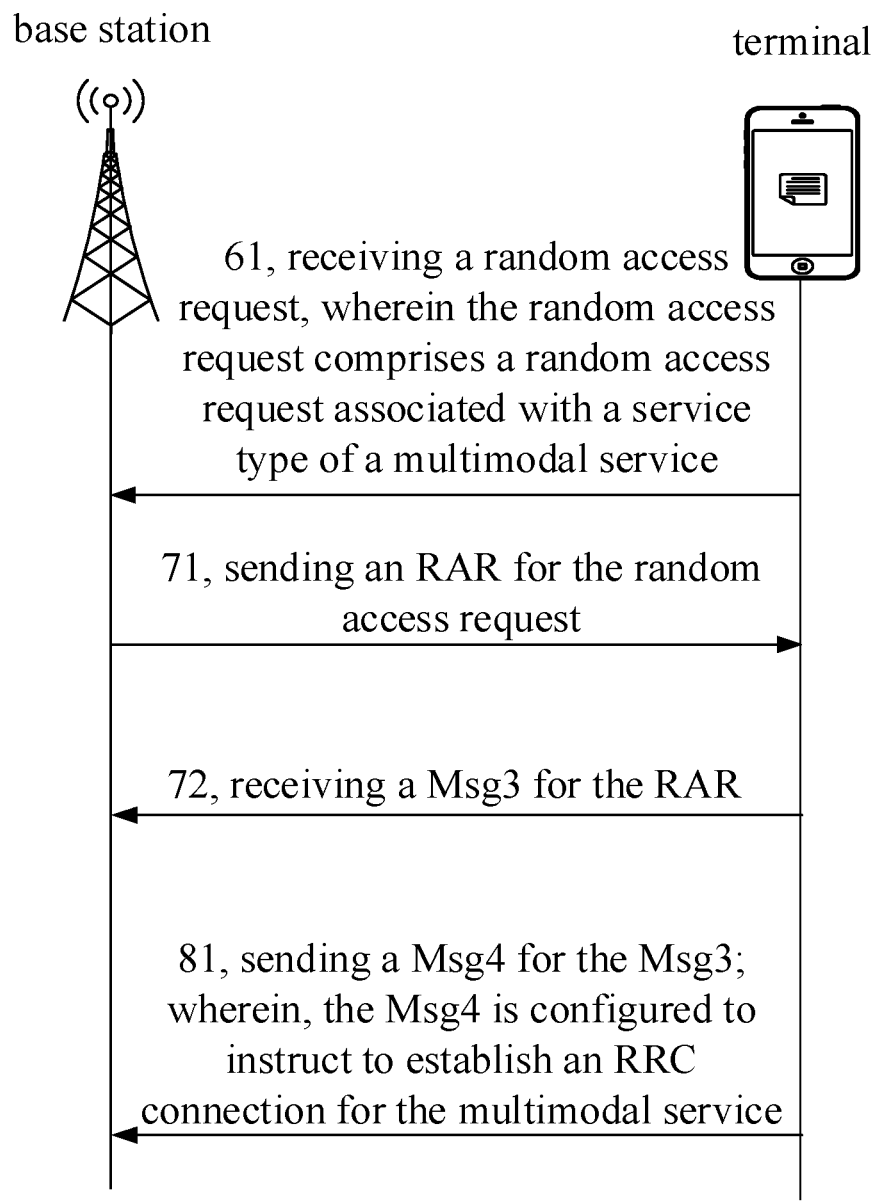
FIG. 8 is a flowchart of a method for random access according to some embodiments.

As shown in FIG. 8, some embodiments provide a method for random access. The method further includes the following.

Step 81, a fourth Msg4 is sent for the third Msg3, in which the Msg4 is configured to instruct to establish a radio resource control (RRC) connection for the multimodal service.

In some embodiments, the Msg4 for the Msg3 includes: the Msg4 carrying type information of the service type of the multimodal service; and/or, the Msg4 carrying an ID of the multimodal service.

In some embodiments, different multimodal services can be differentiated by IDs. For example, the ID of the first multimodal service is "001"; the ID of the second multimodal service is "010".

In some embodiments, the type information of multimodal services of different service types is different. For example, the type information of the multimodal service related to intelligent driving is "A"; the type information of the multimodal service related to telemedicine is "B".

In some embodiments, the Msg4 may simultaneously carry the ID of the multimodal service and the type information of the service type to which the multimodal service belongs. For example, the multimodal service is a remote control service related to a driving service. Herein, the type information of the driving service is "A", and the ID of the remote control service related to the driving service is "001", and then the Msg4 carries both "A" and "001".

Herein, the Msg4 carries the ID of the multimodal service and/or the type information of the service type to which the multimodal service belongs. After receiving the Msg4, the terminal decodes the Msg4. If the ID of the multimodal service of the terminal and/or the type information of the service type of the multimodal service are decoded, it can be determined that the base station allows the terminal to establish the (RRC connection with the base station for the multimodal service.

Figure 9:
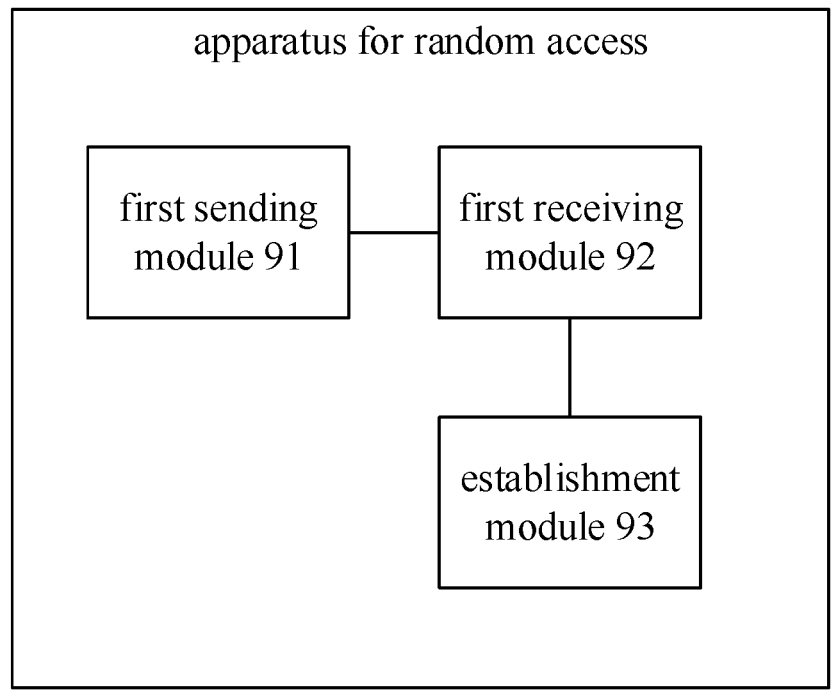
FIG. 9 is a schematic diagram of an apparatus for random access according to some embodiments.

As shown in FIG. 9, some embodiments provide an apparatus for random access. The apparatus is applicable to a terminal. The apparatus includes a first sending module 91.

The first sending module 91 is configured to send a random access request associated with a service type of a multimodal service.

In some embodiments, the first sending module 91 is further configured as: the random access request is a Msg1 for random access or a random access preamble.

In some embodiments, the first sending module 91 is further configured as: IDs of multimodal services of different service types are different and the random access request is associated with the ID of the multimodal service.

In some embodiments, the first sending module 91 is further configured as: the random access request is scrambled by the ID; or, the random access request carries the ID.

In some embodiments, the first sending module 91 is further configured as: the ID is temporarily allocated for the multimodal service; or, the ID is pre-allocated for the multimodal service.

In some embodiments, the first sending module 91 is further configured as: the ID is allocated by a core network or by an access network.

In some embodiments, the first sending module 91 is further configured as: the random access request is associated with the ID of the multimodal service includes: a random access preamble of the random access request has a corresponding relationship with the multimodal service.

In some embodiments, the apparatus further includes: a first receiving module 92, configured to receive an RAR; in which the first sending module 91 is further configured to: in response to receiving the RAR for the random access request, send a Msg3 for the RAR.

In some embodiments, the first receiving module 91 is further configured as: the RAR for the random access request includes: the RAR carrying an ID of the multimodal service; and/or, the RAR carrying type information of the service type to which the multimodal service belongs.

In some embodiments, the first receiving module 91 is further configured as: the ID is carried in a MAC header of a MAC PDU of the RAR or carried in a MAC payload of the MAC PDU of the RAR.

In some embodiments, the first receiving module 91 is further configured as: the type information is carried in a MAC header of a MAC PDU of the RAR or carried in a MAC payload of the MAC PDU of the RAR.

In some embodiments, the first receiving module 91 is further configured as: carried in the MAC header of the MAC PDU of the RAR includes: carried in a newly added MMID subheader in the MAC header of the MAC PDU of the RAR; or, carried in one of an extension field, a type field, and a random access identification field in the MAC header of the MAC PDU of the RAR.

In some embodiments, the first receiving module 91 is further configured as: carried in the MAC payload of the MAC PDU of the RAR includes: carried in the MAC payload of the MAC PDU of the RAR includes: carried in an existing MAC payload of the MAC PDU of the RAR; or, carried in a newly added MAC payload of the MAC PDU of the RAR.

In some embodiments, the first sending module 91 is further configured as: the third message Msg3 for the RAR includes: the Msg3 carrying an ID of the multimodal service; and/or, the Msg3 carrying type information of the service type to which the multimodal service belongs.

In some embodiments, the first sending module 92 is further configured to: resend the random access request in response to not receiving an RAR for the random access request.

In some embodiments, the apparatus further includes: an establishment module 93, in which the first receiving module 92 is further configured to receive a Msg4; and the establishing module 93 is further configured to: in response to receiving the Msg4 for the Msg3, establish an RRC connection for the multimodal service.

In some embodiments, the first receiving module 92 is further configured as: the Msg4 for the Msg3 includes: the Msg4 carrying type information of the service type of the multimodal service; and/or, the Msg4 carrying an ID of the multimodal service.

Figure 10:
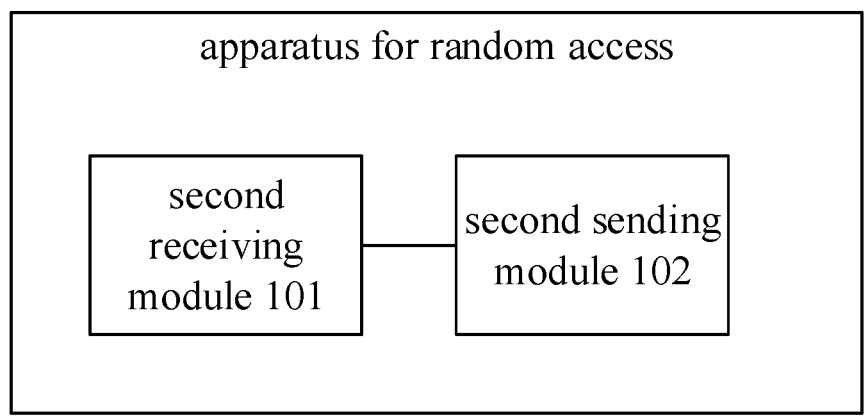
FIG. 10 is a schematic diagram of an apparatus for random access according to some embodiments.

As shown in FIG. 10, some embodiments provide an apparatus for random access. The apparatus is applicable to a base station. The apparatus includes a second receiving module 101, configured to receive a random access request, where the random access request includes a random access request associated with a service type of a multimodal service.

In some embodiments, the second receiving module 101 is further configured as: the random access request is a Msg1 for random access or a random access preamble.

In some embodiments, the second receiving module 101 is further configured as: IDs of multimodal services of different service types are different and the random access request is associated with the ID of the multimodal service.

In some embodiments, the second receiving module 101 is further configured as: the random access request is associated with the ID of the multimodal service includes: the random access request is scrambled by the ID; or, the random access request carries the ID.

In some embodiments, the second receiving module 101 is further configured as: the random access request is associated with the ID of the multimodal service includes: a random access preamble of the random access request has a corresponding relationship with the multimodal service.

In some embodiments, the apparatus further includes: a second sending module 102, configured to send an RAR for the random access request; the second receiving module 101 is configured to receive a Msg3 for the RAR.

In some embodiments, the second sending module 102 is further configured as: the RAR for the random access request includes: the RAR carrying an ID of the multimodal service; and/or, the RAR carrying type information of the service type of the multimodal service.

In some embodiments, the second sending module 102 is further configured as: the type information is carried in a MAC header of a MAC PDU of the RAR or carried in a MAC payload of the MAC PDU of the RAR.

In some embodiments, the second sending module 102 is further configured as: the RAR for the random access request includes: the RAR carrying an ID of the multimodal service.

In some embodiments, the second sending module 102 is further configured as: the ID is carried in a MAC header of a MAC PDU of the RAR or carried in a MAC payload of the MAC PDU of the RAR.

In some embodiments, the second sending module 102 is further configured as: carried in the MAC header of the MAC PDU of the RAR includes: carried in a newly added MMID subheader in the MAC header of the MAC PDU of the RAR; or, carried in one of an extension field, a type field, and a random access identification field set in the MAC header of the MAC PDU of the RAR.

In some embodiments, the second sending module 102 is further configured as: carried in the MAC payload of the MAC PDU of the RAR includes: carried in an existing MAC payload of the MAC PDU of the RAR; or, carried in a newly added MAC payload of the MAC PDU of the RAR.

In some embodiments, the second receiving module 102 is further configured as: the Msg3 for the RAR includes: the Msg3 carrying an ID of the multimodal service; and/or, the Msg3 carrying type information of the service type to which the multimodal service belongs.

In some embodiments, the second sending module 102 is further configured to: send a Msg4 for the Msg3; in which, the Msg4 is configured to instruct to establish an RRC connection for the multimodal service.

In some embodiments, the second sending module 102 is further configured as: the Msg4 for the third message Msg3 includes: the Msg4 carrying type information of the service type of the multimodal service; and/or, the Msg4 carrying an ID of the multimodal service.

With respect to the apparatuses in the above embodiments, the specific manners for performing operations for individual modules therein have been described in detail in the embodiments regarding the methods, which will not be elaborated herein.

Embodiments of the disclosure provide a communication device. The communication device includes a processor; and a memory for storing instructions executable by the processor. The processor is configured to, when executing the executable instructions, performed the method of any embodiment of the disclosure.

The processor may include various types of storage media, which are non-transitory computer storage media that can continue to memorize and store information on the communication device after the power is turned off.

The processor can be connected to the memory through a bus or the like, and is configured to read the executable program stored on the memory.

Embodiments of the disclosure further provide a computer storage medium, in which the computer storage medium stores a computer-executable program, and when the executable program is executed by a processor, the method of any embodiment of the disclosure is performed.

With respect to the devices in the above embodiments, the specific manners for performing operations for individual modules therein have been described in detail in the embodiments regarding the methods, which will not be elaborated herein.

Figure 11:
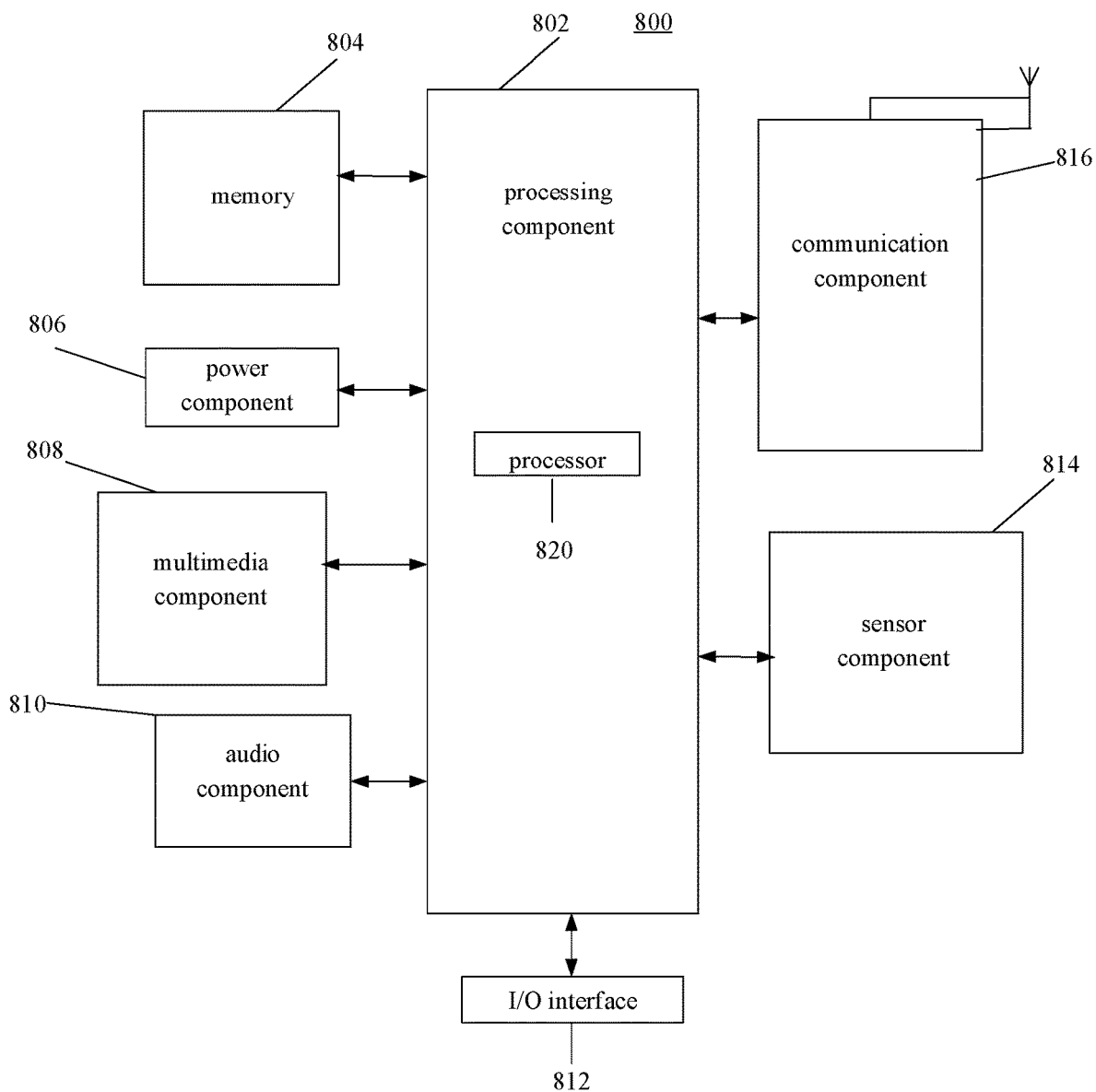
FIG. 11 is a block diagram of a terminal according to some embodiments.

FIG. 11 is a block diagram of a user equipment (UE) 800 according to some embodiments. For example, the user equipment 800 may be a mobile phone, a computer, a digital broadcast terminal, a messaging device, a gaming console, a tablet, a medical device, exercise equipment, a personal digital assistant, and the like.

Referring to FIG. 8, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the user equipment 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the user equipment 800. Examples of such data include instructions for any applications or methods operated on the user equipment 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the user equipment 800. The power component 806 may include a power management system, one or more power sources, and any other components associated with the generation, management, and distribution of power in the user equipment 800.

The multimedia component 808 includes a screen providing an output interface between the user equipment 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the user equipment 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the user equipment 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the user equipment 800. For instance, the sensor component 814 may detect an open/closed status of the user equipment 800, relative positioning of components, e.g., the display and the keypad, of the user equipment 800, a change in position of the user equipment 800 or a component of the user equipment 800, a presence or absence of user contact with the user equipment 800, an orientation or an acceleration/deceleration of the user equipment 800, and a change in temperature of the user equipment 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the user equipment 800 and other devices. The user equipment 800 can access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the user equipment 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 804, executable by the processor 820 in the user equipment 800, for performing the above-described methods. For example, the non-transitory computer-readable storage medium may be a ROM, a RAM, a CD-ROM, a magnetic tape, a floppy disc, an optical data storage device, and the like.

Figure 12:
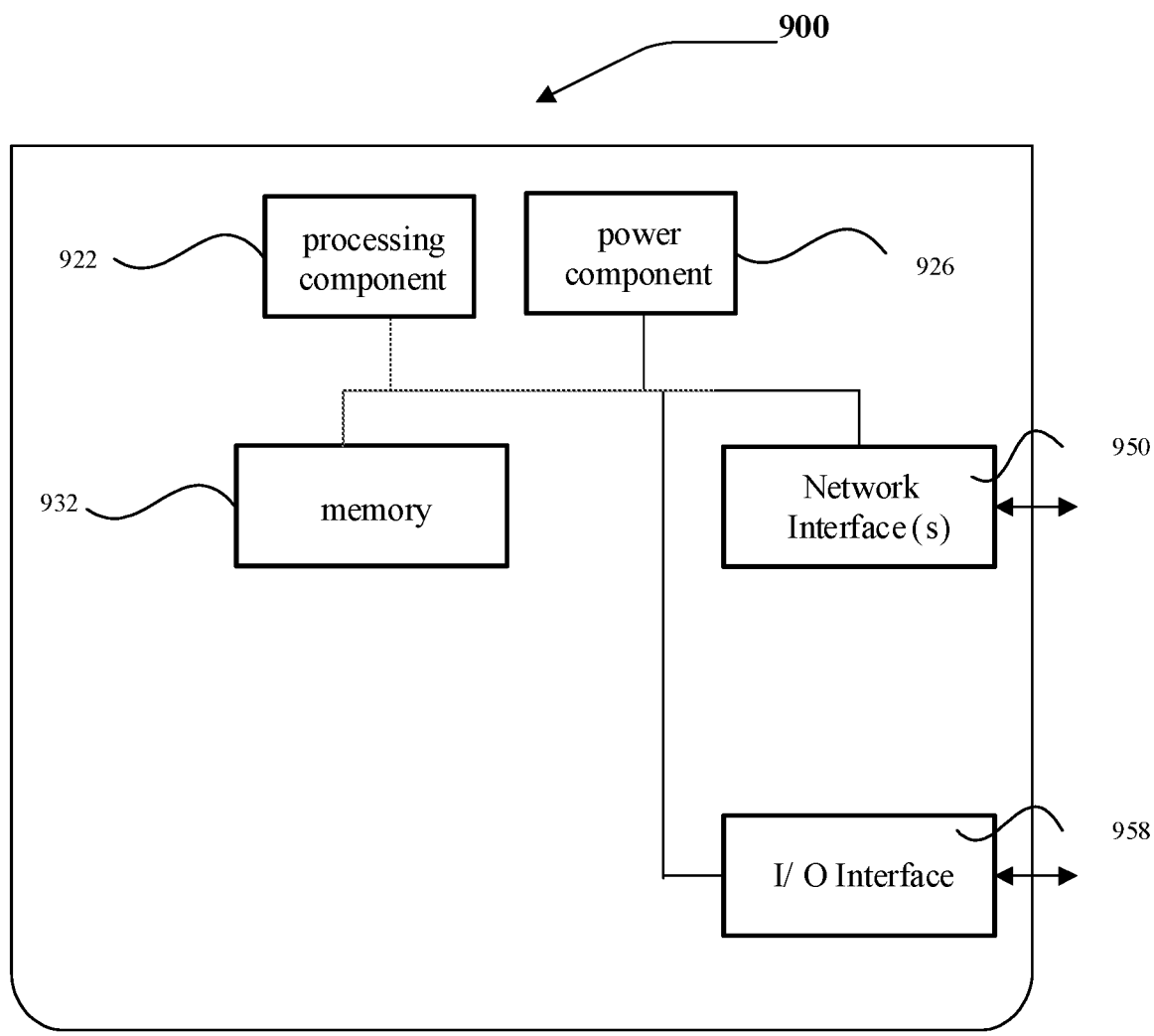
FIG. 12 is a block diagram of a base station according to some embodiments.

FIG. 12 is a block diagram of a base station according to some embodiments. For example, the base station 900 may be a network side device. Referring to FIG. 12, the base station 900 may include a processing component 922 which may include one or more processors, and a memory resource represented by a memory 932 for storing instructions, such as application programs, that can be executed by the processing component 922. Application programs stored in memory 932 may include one or more modules each corresponding to a set of instructions. In addition, the processing component 922 is configured to execute instructions to execute the above described methods previously applied to the base station.

The base station 900 may also include a power component 926 configured to perform power management of the base station 900, a wired or wireless network interface 950 configured to connect the base station 900 to the network, and an I/O interface 958. The base station 900 can operate an operating system based on the memory 932, such as Windows Server™, Mac OS X™, Unix™, Linux™, FreeBSD™, or similar.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for random access, comprising:
sending, by a terminal, a random access request associated with a service type of a multimodal service;
receiving, by the terminal, a random access response (RAR), wherein the RAR is an RAR sent for random access requests sent by a plurality of terminals, and the RAR comprises at least one of followings: the RAR carrying an ID of the multimodal service; or the RAR carrying type information of the service type to which the multimodal service belongs; and
in response to receiving the RAR, sending, by the terminal, a third message (Msg3) for the RAR.

2. The method of claim 1, wherein the random access request comprises a first message (Msg1) for random access or a random access preamble.

3. The method of claim 1, wherein IDs of multimodal services of different service types are different and the random access request is associated with an ID of the multimodal service.

4. The method of claim 3, wherein the random access request is associated with the ID of the multimodal service comprises one of followings:
the random access request is scrambled by the ID; or
the random access request carries the ID,
wherein:
the ID is temporarily allocated for the multimodal service; or
the ID is pre-allocated for the multimodal service;
wherein the ID is allocated by a core network or by an access network.

5. The method of claim 3, wherein the random access request is associated with the ID of the multimodal service comprises:
a random access preamble of the random access request has a corresponding relationship with the multimodal service.

6. The method of claim 1, further comprising:
resending, by the terminal, the random access request in response to not receiving a random access response (RAR) for the random access request.

7. A non-transitory computer storage medium having stored therein instructions that, when executed by a processor of a terminal, causes the terminal to perform the method as claimed in claim 1.

8. The method of claim 1,
wherein the ID is carried in a medium access control (MAC) header of a MAC protocol data unit (PDU) of the RAR or carried in a MAC payload of the MAC PDU of the RAR;
wherein the type information is carried in the MAC header of the MAC protocol data unit (PDU) of the RAR or carried in the MAC payload of the MAC PDU of the RAR;
wherein carried in the MAC header of the MAC PDU of the RAR comprises one of followings:
carried in a newly added multimodal identity (MMID) subheader in the MAC header of the MAC PDU of the RAR; or
carried in one of an extension field, a type field, or a random access identification field in the MAC header of the MAC PDU of the RAR;
wherein carried in the MAC payload of the MAC PDU of the RAR comprises one of followings:
carried in an existing MAC payload of the MAC PDU of the RAR; or
carried in a newly added MAC payload of the MAC PDU of the RAR.

9. The method of claim 1, wherein the Msg3 for the RAR comprises at least one of following messages:
the Msg3 carrying an ID of the multimodal service; or
the Msg3 carrying type information of the service type to which the multimodal service belongs.

10. The method of claim 1, further comprising:
receiving, by the terminal, a fourth message (Msg4); and
in response to receiving the Msg4 for the Msg3, establishing, by the terminal, a radio resource control (RRC) connection for the multimodal service.

11. The method of claim 10, wherein the Msg4 for the Msg3 comprises at least one of following messages:
the Msg4 carrying type information of the service type of the multimodal service; or
the Msg4 carrying an ID of the multimodal service.

12. A method for random access, comprising:
receiving, by a base station, a random access request, wherein the random access request comprises a random access request associated with a service type of a multimodal service;
sending, by the base station, a random access response (RAR) for the random access request, wherein the RAR is an RAR sent for random access requests sent by a plurality of terminals, and the RAR comprises at least one of followings: the RAR carrying an ID of the multimodal service; or the RAR carrying type information of the service type to which the multimodal service belongs; and
receiving, by the base station, a third message (Msg3) for the RAR.

13. The method of claim 12, wherein the random access request is a first message (Msg1) for random access or a random access preamble.

14. The method of claim 12, wherein IDs of multimodal services of different service types are different and the random access request is associated with an ID of the multimodal service.

15. The method of claim 12, further comprising:
sending, by the base station, a fourth message (Msg4) for the Msg3; wherein, the Msg4 is configured to instruct to establish a radio resource control (RRC) connection for the multimodal service.

16. A communication device, comprising:
an antenna;
a memory;
a processor, connected to the antenna and the memory, respectively, configured to execute computer-executable instructions stored on the memory to control transmission and reception of the antenna and to perform the method as claimed in claim 12.

17. A non-transitory computer storage medium having stored therein instructions that, when executed by a processor of a terminal, causes the terminal to perform the method as claimed in claim 12.

18. A communication device, comprising:
an antenna;
a memory;
a processor, connected to the antenna and the memory, respectively, configured to execute computer-executable instructions stored on the memory to control transmission and reception of the antenna and to:
send a random access request associated with a service type of a multimodal service;
receive a random access response (RAR), wherein the RAR is an RAR sent for random access requests sent by a plurality of terminals, and the RAR comprises at least one of followings: the RAR carrying an ID of the multimodal service; or the RAR carrying type information of the service type to which the multimodal service belongs; and
in response to receiving the RAR, send a third message (Msg3) for the RAR.

* * * * *